(12) United States Patent
Yim et al.

(10) Patent No.: US 10,328,838 B2
(45) Date of Patent: Jun. 25, 2019

(54) UTILITY TRAILER WITH MULTIPLE MODES OF CONVEYANCE AND OPERATION

(71) Applicant: Kärcher North America, Inc., Denver, CO (US)

(72) Inventors: Rasmey Yim, Vancouver, WA (US); Kyle Murray, Vancouver, WA (US); Shannon Taylor, Vancouver, WA (US)

(73) Assignee: KÄRCHER NORTH AMERICA, INC., Denver, CO (US)

( * ) Notice: Subject to any disclaimer, the term of this patent is extended or adjusted under 35 U.S.C. 154(b) by 191 days.

(21) Appl. No.: 15/417,621

(22) Filed: Jan. 27, 2017

(65) Prior Publication Data

US 2017/0217356 A1    Aug. 3, 2017

Related U.S. Application Data

(60) Provisional application No. 62/288,291, filed on Jan. 28, 2016.

(51) Int. Cl.
| | |
|---|---|
| *B62D 63/06* | (2006.01) |
| *B60P 3/30* | (2006.01) |
| *B60T 1/04* | (2006.01) |
| *B60T 1/00* | (2006.01) |
| *B60T 7/04* | (2006.01) |
| *B60B 33/06* | (2006.01) |

(52) U.S. Cl.
CPC ............... *B60P 3/30* (2013.01); *B60T 1/005* (2013.01); *B60T 1/04* (2013.01); *B60T 7/045* (2013.01); *B62D 63/064* (2013.01); *B62D 63/065* (2013.01); *B60B 33/066* (2013.01)

(58) Field of Classification Search
CPC ......... B60P 3/30; B62D 63/065; B62D 63/08; B62D 53/0864; B62D 63/064; B60T 1/005; B60T 1/04; B60T 7/045; B60B 33/066
See application file for complete search history.

(56) References Cited

U.S. PATENT DOCUMENTS

| 1,063,878 A | * | 6/1913 | Hart | ........................ F16D 53/00 |
| | | | | 16/35 R |
| 2,639,785 A | * | 5/1953 | Vickers | ..................... B60T 1/04 |
| | | | | 180/209 |

(Continued)

FOREIGN PATENT DOCUMENTS

| WO | WO 98/42933 | 10/1998 |
| WO | WO 2008/068490 | 6/2008 |

OTHER PUBLICATIONS

"Entrepreneur IV Trailer Package," AaLadin Cleaning Systems, © 2012, 1 page.

(Continued)

*Primary Examiner* — Charles G Freay
*Assistant Examiner* — Thomas Fink
(74) *Attorney, Agent, or Firm* — Sheridan Ross P.C.

(57) ABSTRACT

A trailer device is provided with pressure washing features and devices. The trailer device is convertible between at least a first and mode of transport, wherein a first mode comprises a towing mode, and a second mode comprises a push or manual operation mode. The device also comprises various on-board features and control systems such that a fully-functional pressure washing unit is provided that is easily transporting between locations.

19 Claims, 7 Drawing Sheets

(56) References Cited

U.S. PATENT DOCUMENTS

| | | | | |
|---|---|---|---|---|
| 2,926,930 | A | * | 3/1960 | Pease ................ B60D 1/66 280/414.1 |
| 2,981,552 | A | * | 4/1961 | Rutigliano ............ B60D 1/66 280/763.1 |
| 3,117,653 | A | * | 1/1964 | Altherr ................ B62B 5/04 188/20 |
| 3,314,692 | A | * | 4/1967 | Karns ................ B60D 1/66 254/420 |
| 3,811,535 | A | * | 5/1974 | Preusser ............ B62B 5/04 188/21 |
| 3,841,663 | A | * | 10/1974 | Proffit ................ B60D 1/66 248/188.4 |
| 4,175,783 | A | * | 11/1979 | Pioth ................ A61G 7/00 188/1.12 |
| 4,266,796 | A | * | 5/1981 | Riggs ............ B62D 53/0857 280/414.1 |
| 4,779,889 | A | * | 10/1988 | Morrison ............ B60B 33/00 280/475 |
| 4,871,183 | A | * | 10/1989 | Moss ................ B60D 1/66 280/475 |
| D310,799 | S | * | 9/1990 | van der Merwe ........ D12/106 |
| 5,335,856 | A | * | 8/1994 | Nathan ............ A01B 59/042 172/324 |
| 5,390,942 | A | * | 2/1995 | Schuster ............ B62B 5/04 280/19 |
| 5,533,671 | A | | 7/1996 | Baer |
| 5,575,036 | A | * | 11/1996 | May ................ B60B 33/06 16/32 |
| 5,601,158 | A | * | 2/1997 | Klusmeyer ............ B60T 1/005 188/31 |
| 5,765,665 | A | * | 6/1998 | Cheng ................ B62B 9/082 188/1.12 |
| 5,886,436 | A | | 3/1999 | Schneider et al. |
| 6,082,631 | A | * | 7/2000 | Aslakson ............ B60P 3/14 239/146 |
| 6,761,135 | B1 | * | 7/2004 | Becktold ............ B08B 3/026 122/396 |
| 7,396,034 | B2 | * | 7/2008 | Wilson, Jr. ............ B60D 1/66 280/475 |
| 7,425,012 | B1 | * | 9/2008 | Sease ................ B60D 1/66 280/475 |
| 7,547,044 | B2 | * | 6/2009 | Cokeley ............ B60P 3/36 280/475 |
| 7,585,000 | B1 | * | 9/2009 | Hoek ................ A01M 7/0085 220/562 |
| D619,933 | S | | 7/2010 | McIntosh et al. |
| D626,461 | S | | 11/2010 | Barrios et al. |
| 8,523,148 | B2 | * | 9/2013 | Beck ................ B60D 1/66 254/420 |
| D691,925 | S | | 10/2013 | Hindle |
| D695,647 | S | | 12/2013 | Manley |
| D698,701 | S | | 2/2014 | Dempsey et al. |
| D706,684 | S | | 6/2014 | Dempsey et al. |
| D751,466 | S | | 3/2016 | Freitag et al. |
| D760,122 | S | | 6/2016 | Guidry |
| D761,160 | S | | 7/2016 | Gilles Duros et al. |
| D779,380 | S | | 2/2017 | van den Berg |
| D793,911 | S | | 8/2017 | Yim et al. |
| 2002/0166202 | A1 | * | 11/2002 | Maupin ............ B60B 33/0005 16/19 |
| 2006/0118149 | A1 | | 6/2006 | Benson et al. |
| 2007/0089766 | A1 | | 4/2007 | Fanourgiakis et al. |
| 2007/0152425 | A1 | * | 7/2007 | Richards ............ B60D 1/66 280/476.1 |
| 2011/0036418 | A1 | * | 2/2011 | Hendy ................ B08B 3/02 137/335 |
| 2011/0079659 | A1 | * | 4/2011 | Wilken ............ A01G 25/09 239/73 |
| 2015/0306614 | A1 | * | 10/2015 | Pierce ................ B05B 9/007 137/12 |

OTHER PUBLICATIONS

"ProTowWash Trailers, Movile Self-Contained Water Tank Trailer System," Hydro Tek, Feb. 2015, 2 pages.
"Single-Axle Trailers Product Sheet," Mi-T-M Corporation, Dec. 2015, 2 pages.

* cited by examiner

UTILITY TRAILER WITH MULTIPLE MODES OF CONVEYANCE AND OPERATION

This U.S. Non-Provisional Patent Application claims the benefit of priority from U.S. Provisional Patent Application Ser. No. 62/288,291, filed Jan. 28, 2016, the entire disclosure of which is hereby incorporated by reference in its entirety.

FIELD

The present disclosure relates generally to utility trailers. More specifically, the present disclosure relates to utility trailers comprising at least one on-board device, and trailers that are convertible between at least a towing mode and a push or hand-operated mode.

BACKGROUND

Utility trailers and portable pressure washing devices are well known. Prior art devices related to utility trailers and portable pressure washers, however, generally fail to provide devices that can be selectively converted between at least one mode wherein the device is towed by an additional vehicle, and at least one additional mode wherein the device is manually operated or conveyed by user.

SUMMARY

Accordingly, there has been a long-felt and unmet need to provide a trailer device that is convertible between first and second modes of conveyance or transport. In preferred embodiments, the first mode of conveyance comprises a conventional towing mode, wherein the trailer is supported on two wheels and wherein the trailer device is towed by an additional vehicle. The second mode in such embodiments comprises a human-powered mode wherein at least a third wheel is deployed to a position of use and wherein the trailer device is provided as a cart or similar feature that is powered by and controlled by one or more users.

In various embodiments, a trailer device is provided comprising at least one wheel that is convertible between a position of storage and a position of use. In certain embodiments, a trailer device is provided comprising a primary set of wheels positioned proximal a rear portion of the trailer and wherein the primary wheels are provided for use and contact with a ground surface in all positions or modes of use. At least one secondary wheel is provided proximal a forward portion of the trailer, wherein the secondary wheel is convertible between a position of use and a position of non-use. In the position of non-use, the secondary wheel is provided in an elevated position relative to a ground surface.

In certain embodiments, the trailer device comprises a secondary wheel on a pivot arm that is convertible between a position of use and a position of non-use, and a push handle provided at an opposing end of the trailer. In some embodiments, the secondary wheel and associated pivot arm are provided on or proximal to a tongue of the trailer device, and the secondary wheel comprises a rotatable wheel for ease of steering, maneuverability, etc. The primary wheels are provided at a rear end of the device, generally beneath the push handle and are provided for use and contact with the ground regardless of the position of the secondary wheel(s).

In preferred embodiments, trailer devices are provided that comprise an integrated pressure washer system. Although the present disclosure contemplates various trailer features as shown and described herein being used and provided with any kind of trailer (e.g. a flatbed utility trailer for storing and hauling various items), preferred embodiments provide an integrated portable pressure washer provided on the trailer. In such embodiments, a trailer device comprises a hot water tank, a pump, a portable power source, and at least one dispensing hose or wand for dispensing contents from the hot water tank under pressure. The trailer device may further comprise control features for operating the integrated pressure washer features and associated power source.

In certain embodiments, trailer devices of the present disclosure comprise a braking member. Braking members of the present disclosure include, for example, a foot brake comprising a bar member that is selectively brought into directly contact with at least one of the wheels and/or tires of the trailer member. In one embodiment, a moveable foot brake in the form of a crossbar is provided, wherein the crossbar is moveable between a first position contacting two primary wheels of the trailer device, and a second position wherein the wheels are not contacted by the foot brake. The foot brake may be particularly useful, for example, when the device is to be provided in a substantially fixed position while cleaning or pressure washing operations are conducted.

Although various embodiments of the present disclosure contemplate that the trailer device is provided primarily as a portable pressure washer unit, additional embodiments provide and contemplate that various additional features and/or storage features are provided in association with the trailer device. Trailer devices of the present disclosure may comprise various tools, storage areas, and integrated features in addition to or in lieu of a pressure washer unit.

In various embodiments, a trailer device is provided that is adapted for use as a towed vehicle and/or as a device that is pushed or otherwise manually manipulated by a user. In order to accomplish these objectives, trailer devices of the present disclosure are contemplated as comprising a center of gravity that is provided in a preferred location to allow for ease of transport and handling in at least one of two modes of use. In certain embodiments, a trailer device and related components are arranged such that the center of mass of the device is located approximately over a pair of rear wheels of the device, thereby enabling a user to easily grasp, rotate, and manipulate the device. In such embodiments, the trailer device and related components including pressure washing devices and features are constructed and arranged such that the center of mass is provided in a preferred location and is substantially fixed.

In certain embodiments, trailer devices of the present disclosure are provided with at least one wheel comprising an adjustable or "swing-up" wheel that is selectively deployed, extended, lowered, etc. when the trailer device is not provided in a towing arrangement, and that is retracted, raised, or pivoted to a position of non-use when the trailer device is provided in a towing arrangement. Various trailer tongues are known to comprise a swivel or caster wheel that is adjustable and/or capable of being rotated about a horizontal axis. Known devices, however, comprise a rotatable shaft with a wheel provided on a distal end. The shaft is generally frictionally engaged in a desired position by an arcuate plate. The engagement of the shaft generally does not comprise a secure position, particularly as the device wears over its lifetime. The present disclosure contemplates a rotatable swivel or caster wheel provided proximal a forward end of a trailer device. The caster wheel comprises a pin connection that is securable in at least two positions, a first position comprising a position of use for the caster wheel and the second position comprising a position of non-use for the caster wheel when the trailer is provided in a towing arrangement.

In one embodiment, a portable pressure washer is provided. The portable pressure washer comprises a chassis comprising a forward end and a rearward end, and the forward end comprises a tongue adapted for connecting the chassis to a vehicle for towing the portable pressure washer. A first pair of wheels is provided proximal to the rearward end of the chassis, wherein the first pair of wheels is provided for supporting and conveying the chassis. At least one secondary wheel is provided proximal to the forward end of the chassis, wherein the at least one secondary wheel is rotatable between a position of use and a position of non-use. The chassis comprises at least one tank, a pump, a heating element, a power source, and a dispensing device, wherein the dispensing device is adapted to dispense contents of the tank. A braking member is provided that selectively contacts the first pair of wheels to limit a movement of the chassis.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
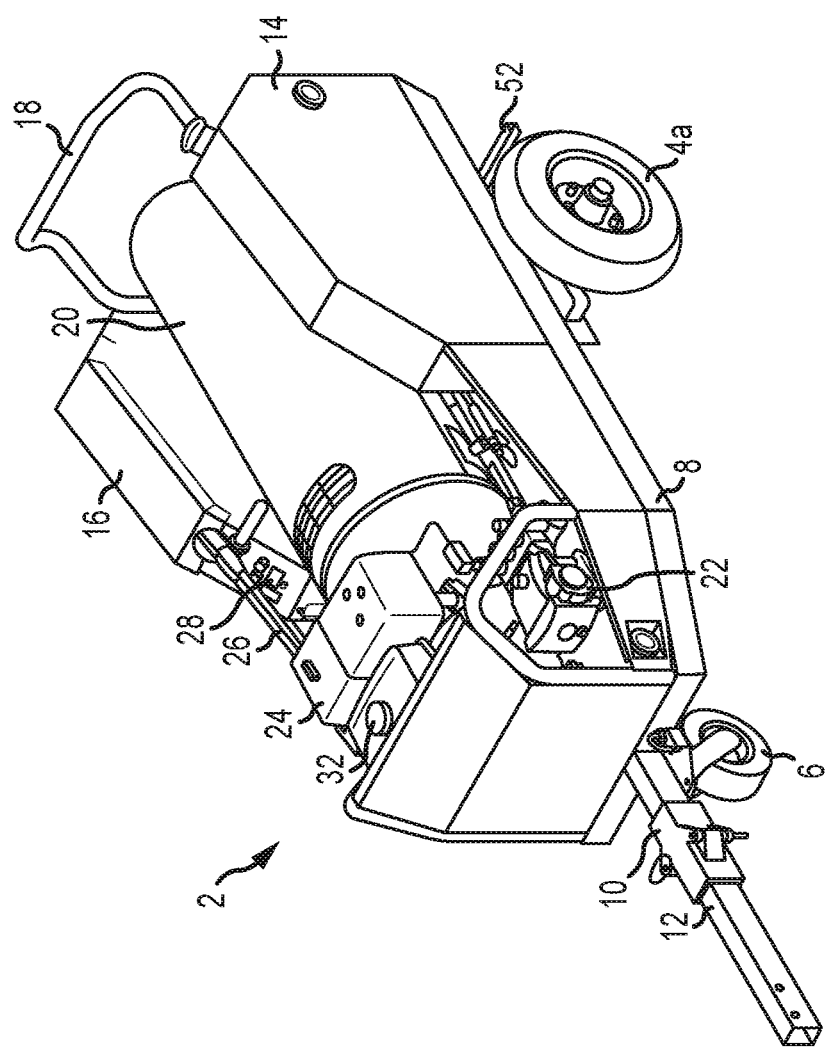

FIG. 1 is a front perspective view of a trailer device according to one embodiment of the present disclosure.

Figure 2:
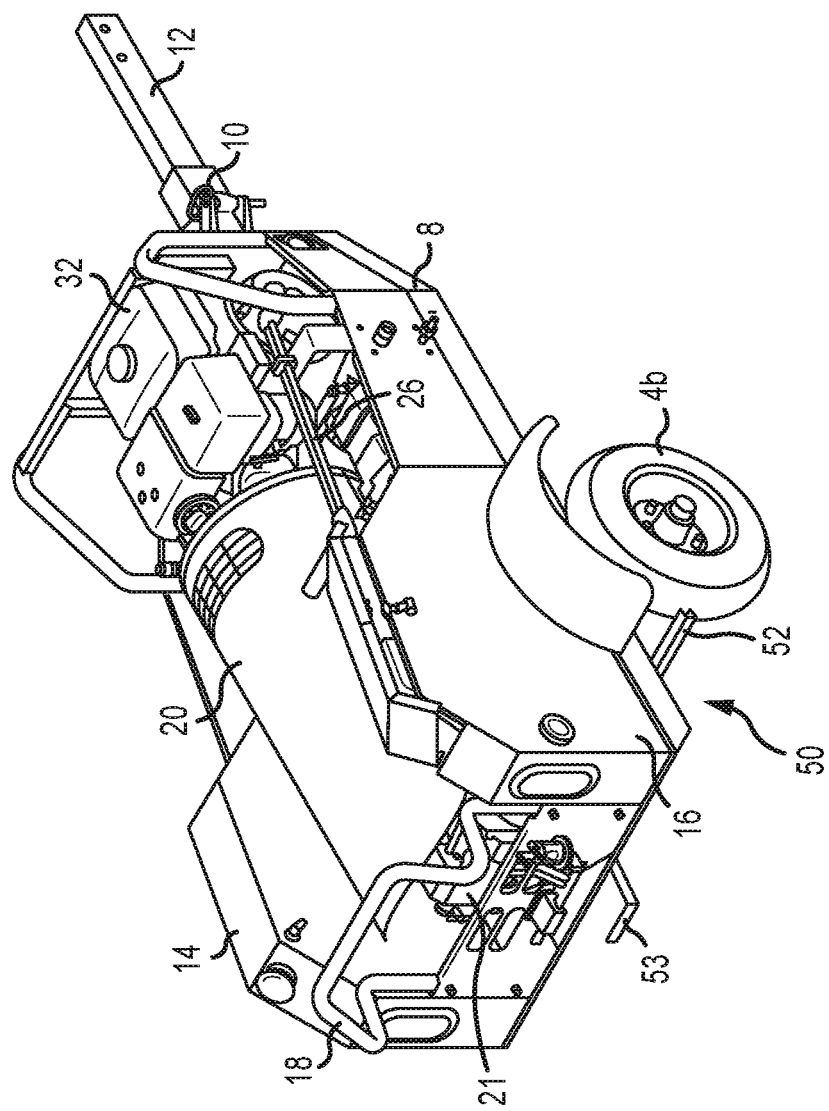

FIG. 2 is a rear perspective view of a trailer device according to one embodiment of the present disclosure.

Figure 3:
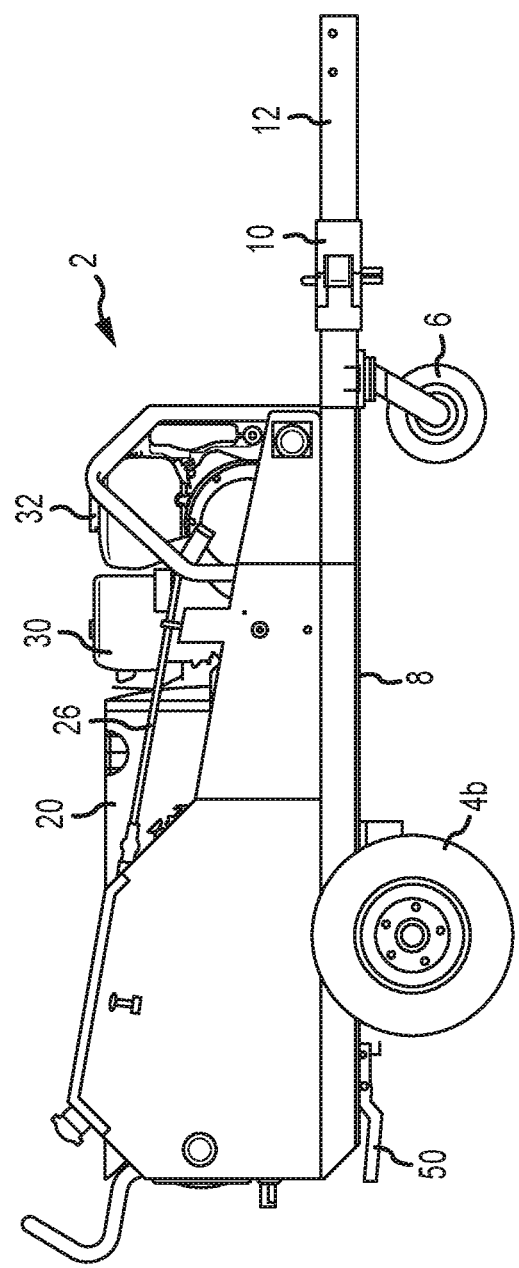

FIG. 3 is a side elevation view of a trailer device according to one embodiment of the present disclosure.

Figure 4:
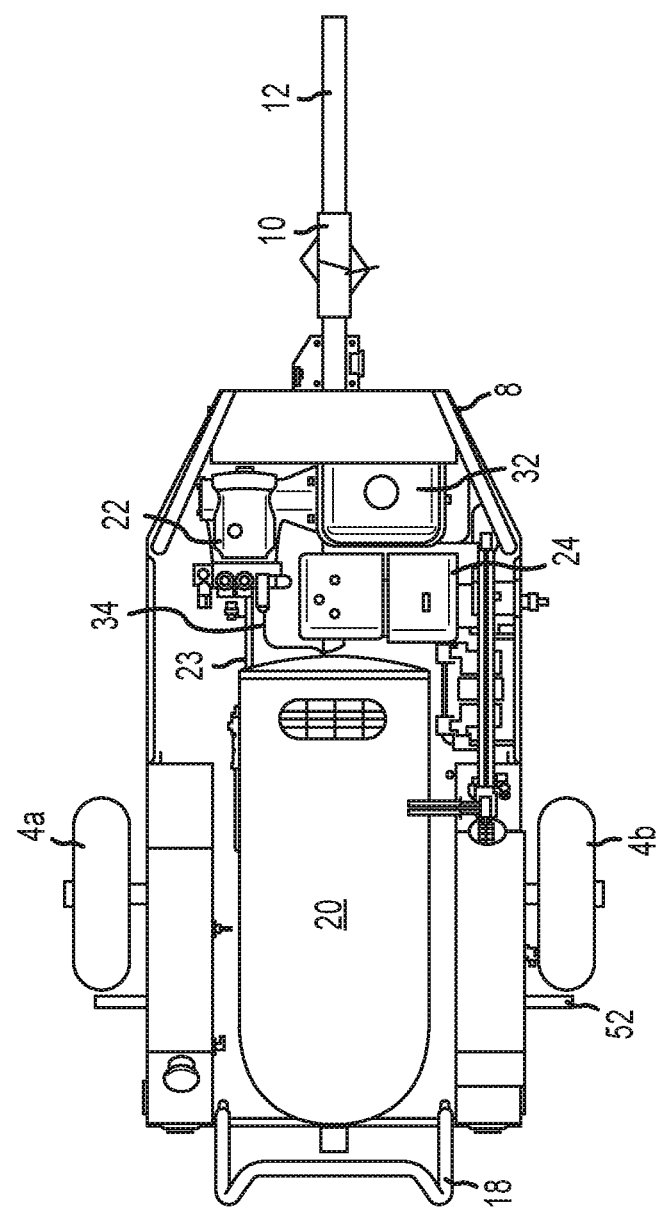

FIG. 4 is a top plan view of a trailer device according to one embodiment of the present disclosure.

Figure 5:
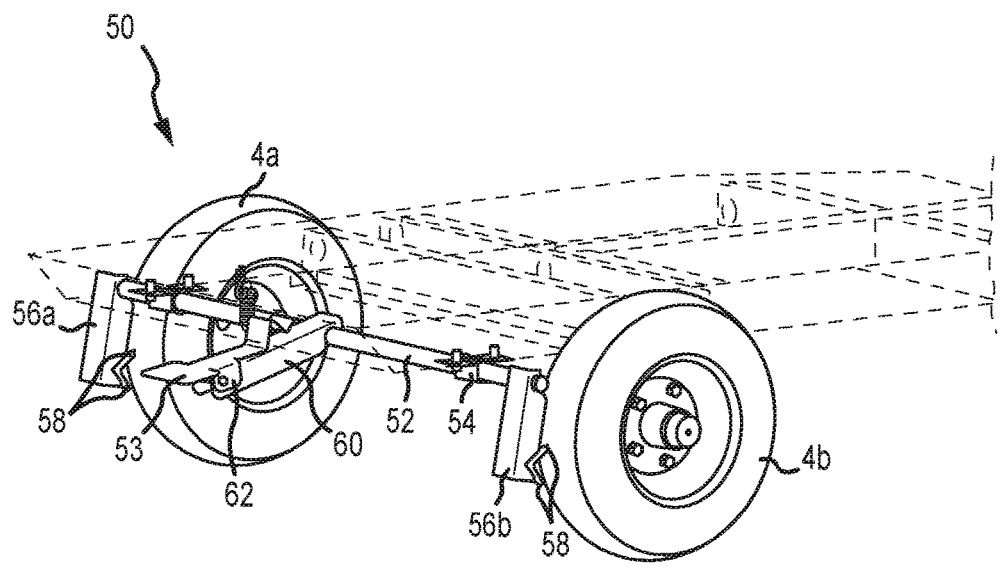

FIG. 5 is a perspective view of a component of a trailer device according to one embodiment of the present disclosure.

Figure 6:
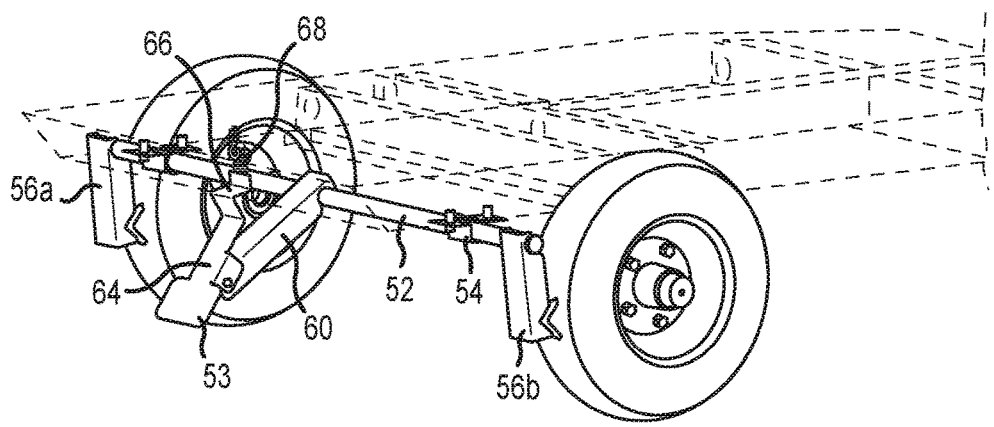

FIG. 6 is a perspective view of a component of a trailer device according to the embodiment of FIG. 5.

Figure 7:
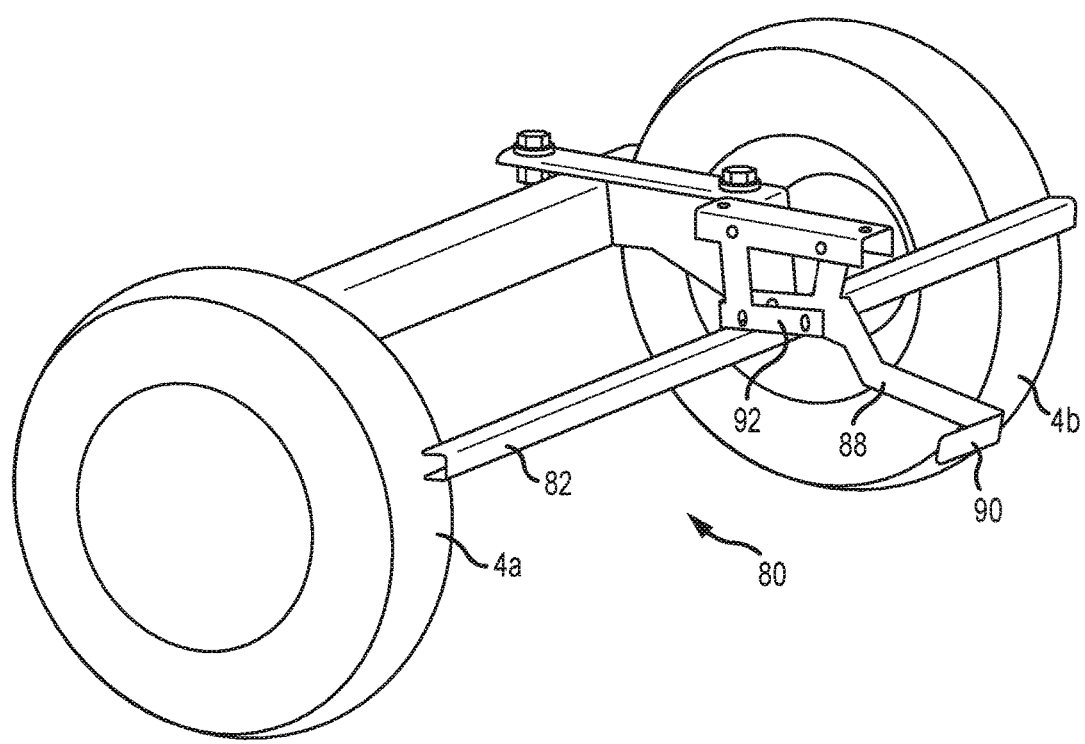

FIG. 7 is a perspective view of a component of a trailer device according to one embodiment of the present disclosure.

Figure 8:
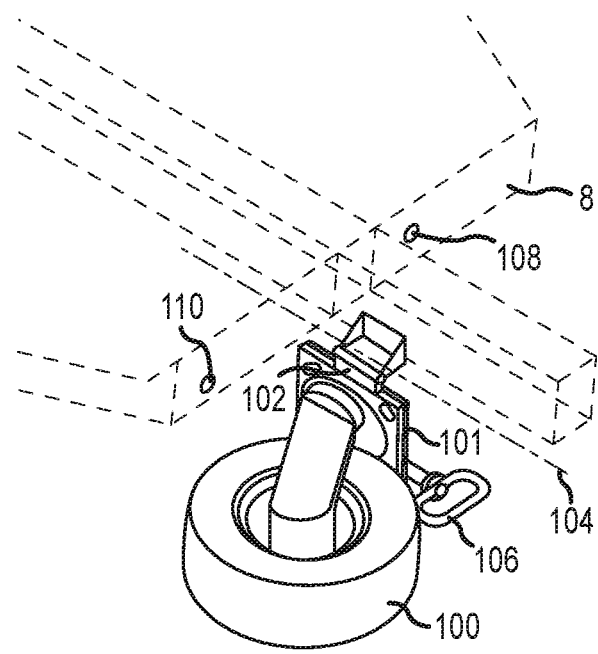

FIG. 8 is a perspective view of a component of a trailer device according to one embodiment of the present disclosure.

Figure 9:
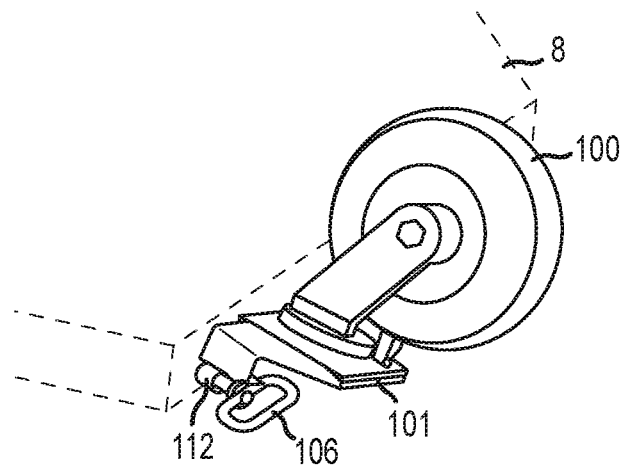

FIG. 9 is a perspective view of a component of a trailer device according to the embodiment of FIG. 8.

DETAILED DESCRIPTION

FIG. 1 is a front perspective view of a trailer device 2 according to one embodiment of the present disclosure. As shown, the trailer device 2 comprises a portable hot water pressure washer provided on a chassis 8. The trailer device 2 is suitable for towing by an additional vehicle and/or pushing and manipulating the device 2 manually. The device 2 preferably comprises a push-handle portion 18 provided proximal to the rear end of the device and adapted for grasping by a user such that a user may manually pivot and translate the device 2. A tongue 10 is provided proximal a forward end of the device 2. The tongue 10 comprises an extendable portion 12 for selectively adjusting a length of the tongue, and wherein the extendable portion 12 and the tongue 10 are adapted to connect to an additional vehicle for towing the device 2. A secondary wheel 6 is provided proximal the forward end of the device 2. In the embodiment provided in FIG. 1, the wheel 6 is provided and connected to a base portion of the tongue 10. It will be recognized, however, that the specific location of the wheel 6 on the front end of the device 2 is not critical to the present invention. As shown, the device comprises a pair of wheels 4a, 4b provided on a chassis 8 of the device 2. The pair of primary wheels 4a, 4b generally comprises a pair of opposing wheels that are symmetrical about a centerline of the chassis 8. The primary wheels 4a, 4b are preferably rotatable about a horizontal axis (i.e. to permit rolling of the device), but are otherwise in a fixed position relative to the chassis. The primary wheels 4a, 4b preferably do not comprise steering wheels. In alternative embodiments, however, the wheels 4a, 4b comprise articulating or steerable wheels. The pair of wheels 4a, 4b is provided to allow the device 2 to be towed using the two wheels 4a, 4b and/or allow the trailer device 2 to be pushed by a user on the pair of wheels 4a, 4b and the additional wheel 6.

In the embodiment depicted in FIG. 1, the trailer device 2 comprises hot water pressure washing features as shown and described herein. The device 2 comprises, for example, a water heater provided within a shroud 20 provided on the chassis 8 of the trailer device 2. A hot water heating tank 21 (see FIG. 2) and associated heating elements are preferably provided with a shroud as shown in FIG. 2 to protect users and internal components. In the depicted embodiment, a hot water pressure washer is provided comprising a gas-powered engine 24 for driving a pump 22, the pump 22 being provided to pressurize a heated fluid received from the heating tank 21. The chassis 8 also preferably contains or houses a fuel tank 32 for storing and providing fuel to the engine 24. Such devices are generally contained and confined within the chassis 8 of the device 2, as shown in FIG. 1. In alternative embodiments, however, it is contemplated that certain pressure washing features or other device features may extend outwardly from the chassis.

Although gas-powered pressure washers are contemplated as being provided on or in connection with trailer devices in certain embodiments of the present disclosure, alternative embodiments contemplate the use of alternative devices including, for example, electric motor-powered pressure washers. For example, the high-pressure cleaning devices described in U.S. Pat. No. 5,886,436 to Schneider et al., which is hereby incorporated by reference in its entirety, are contemplated for use in certain embodiments of the present disclosure. Specific pressure washing components and features may be substituted based upon user preference and the preferred or intended environment in which the device is to be used. In certain embodiments, a trailer is provided with both gas and electric powered pressure washing components. In such embodiments, electric-powered components may be selectively activated or utilized to perform pressure washing operations in environments where gas powered devices are not preferred (e.g. indoor or poorly ventilated areas).

The trailer device 2 provided in FIG. 1 comprises a chassis 8 with a first housing 14 and a second housing 16, wherein each housing 14, 16 extends upwardly from the chassis 8, and is provided toward a rear portion of the trailer device 2. The housings 14, 16 provide protection to various components of the device and/or are adapted for storing and housing materials and additional features. For example, one or more of the housings 14, 16 preferably comprises an internal volume adapted for storing fluid including, but not limited to, gasoline, unused cleaning fluid, spent cleaning fluid, etc. Additionally, the housings 14, 16 may comprise general storage areas for tools, waste and other solid objects. In the embodiment provided in FIG. 1, the second housing 16 comprises an interior storage volume adapted for housing and storing various components associated with an on-board pressure washer. For example, the second housing 16 is provided and adapted to receive and store at least a portion of a spray wand 26 provided with the pressure washer. A portion of the second housing 16 also preferably contains control systems, including electrical and mechanical features associated with pressure washer controls 28. Such features are preferably sealed or generally protected from outside environments and associated moisture.

FIG. 2 is a rear perspective view of the trailer device 2 according to the embodiment of FIG. 1. As shown, the trailer device 2 comprises various features and components shown and described with respect to FIG. 1. A water heating system is provided, the system comprising a shroud 20 provided around a hot water heater 21 for heating a fluid to be conveyed to the pump and ultimately used for hot water pressure washing operations. In various embodiments, water heater features 21 are selectively activated, and may be employed only when pressure washing operations are intended to be conducted with hot or heated water. In such embodiments, water or cleaning fluid may bypass heating features or operations, and pressure washing operations may be conducted without heating or pre-heating the fluid. The shroud 20 is provided to at least partially insulate heating elements of the system, and prevent and protect users and various objects from contacting potentially hot elements of the system.

As further shown in FIG. 2, the trailer device 2 comprises a braking feature 50 for at least partially preventing a movement of the wheels 4a, 4b. As shown, the braking feature 50 comprises a crossbar 52 and a user-interface 53. The user-interface 53, which may be provided as a foot pedal, is operable to transition the crossbar 52 between locked and unlocked positions. Specifically, a locked position is contemplated wherein the crossbar 52 is provided in contact with the wheels 4a, 4b and an unlocked position is provided wherein the crossbar 52 is provided in a non-contact position with the wheels (as shown in FIG. 2). As shown and described in more detail herein, the braking feature 50 comprises a linkage between the user-interface 53 and the crossbar 52. The braking feature 50 preferably comprises a locking feature that substantially prevents an undesired movement of the trailer device 2, such as may be desirable when the unit is being used for pressure washing operations and is not being transported. The braking feature 50 is preferably not intended to bring the trailer 2 to a resting position from a high rate of speed, as the crossbar 52 interacts directly with the outer surfaces of the tires and/or wheels 4a, 4b. In various embodiments, however, additional braking systems are contemplated as being provided with the trailer including hydraulic braking systems designed and adapted for slowing or otherwise regulating a speed of the trailer when being towed.

FIG. 3 is a side elevation view of a trailer device 2 according to the embodiment provided in FIGS. 1-2 of the present disclosure. As shown, the trailer device 2 comprises various features and devices as shown and described with respect to FIGS. 1 and 2. The braking element 50 is provided proximal a rear end of the device 2, and is adapted to contact at least one of the wheels 4a, 4b.

FIG. 4 is a top plan view of a trailer device 2 according to the embodiment provided in FIGS. 1-3 of the present disclosure. As shown, the trailer device 2 comprises various features and devices as shown and described with respect to FIGS. 1-3. A hot water pressure washing system is provided on the trailer device 2, and the various components thereof, is illustrated in the top view of FIG. 4. Specifically, a hot water tank and heater are provided within a shroud 20. The hot water tank and/or heater may comprise any number of commercially available devices, either known or yet to be developed. Additionally, embodiments of the present disclosure contemplate that the trailer need not be equipped with a water heater, and may comprise a cold water pressure washer system (not shown) or other device known to be useful on a portable cleaning device. A fuel tank 32 and driving engine 24 are provided proximal a forward portion of the chassis 8. The engine 24 is operable to drive a pump 22, which is also provided proximal a forward portion of the chassis 8. The pump is in communication with at least the hot water heater confined within the shroud 20. A conduit 23 is provided to convey heated fluid to the pump for pressurization, and ultimately for dispensation in a cleaning or washing operation. An electrical connection 34 is also provided such that at least the pump 22 and the water heater 21 are in communication with one another. For example, the pump 22 may signal the water heater 21 to initiate heating functions when the pump is running via the electrical connection 34 provided between the components. The pump 22 is also preferably in communication with the engine 24, and communication between the pump and engine may include, for example, signals adapted to control the functioning of the engine based on an operating parameter of the pump 22. For example, connections, methods, and features as shown and described in U.S. patent application Ser. No. 14/696,127, filed Apr. 24, 2015, which is hereby incorporated by reference in its entirety, may be provided on the trailer device(s) 2 shown and described herein.

FIG. 5 is a rear perspective view of a trailer device 2 according to one embodiment of the present disclosure. As shown, the trailer device 2 comprises a braking feature 50 adapted to at least partially secure the wheels 4a, 4b of the trailer 2. The braking feature 50 is provided in a first position in FIG. 5 (a position of non-use) and comprises a crossbar 52 extending laterally and provided rearward of the wheels. The crossbar 52 is supported by brackets 54, and is allowed to rotate therein. The crossbar 52 comprises opposing first and second ends. The first and second ends comprise extensions 56a, 56b and each of the extensions 56a, 56b comprise braking surfaces 58 for contacting the wheels 4a, 4b or associated tires. In the depicted embodiment, the braking surfaces 58 comprise first and second substantially rigid portions provided at an angle with respect to the extensions 56a, 56b. The braking surfaces of FIG. 5 are adapted to be provided in contact with the wheel or tire at angles that are adapted to substantially prevent an undesired rotation of the wheel 4a, 4b. In preferred embodiments, at least one of the braking surfaces 58 of the extensions 56 are provided in a position that is substantially tangential to a circumference of the tire or wheel when the braking surface(s) is brought into contact with the tire or wheel. Such a position maximizes the amount of braking or stopping force that the braking feature 50 provides to the wheels and trailer.

As further shown in FIG. 5, the braking feature 50 comprises a user-interface 53 to allow a user to selectively engage and disengage the braking feature 50. As shown, the user-interface 53 comprises a foot pedal interconnected to an extension lever 60. The extension lever 60 extends substantially perpendicularly from the crossbar and is operable to rotate the crossbar 52 and associated extensions 56a, 56b. The user-interface 53 is preferably hingedly connected to the extension lever 60 by a pin connection 62, and is operable to rotate the braking feature 50 to a locked position as shown in FIG. 6.

FIG. 6 is a rear perspective view of the trailer device and braking feature 50 of FIG. 5 and wherein the braking feature 50 is shown in a second position (a position of use or braking). In FIG. 6, the braking feature 50 is provided in a locked position wherein the braking surfaces 58 of the extensions 56a, 56b are provided in contact with the wheels 4a, 4b. The position provided in FIG. 6 results from a depression of the user-interface 53, which is interconnected to a rocker arm 64 comprising a locking surface 66. The locking surface 66 is operable to contact a lower or bottom portion of the frame of the chassis (not shown in FIG. 6) and maintain the braking feature 50 in a locked position. A coil spring 68 is provided and connected at a first end to the chassis and at a second to the extension lever 60 of the braking feature 50. The coil spring 68 biases the extension lever 60 and associated components, including the extensions 56a, 56b and user-interface upwardly to assist in freeing the locking surface 66 from a locked position and returning the braking feature 50 to the disengaged or unlocked position.

FIG. 7 is a rear perspective view of a trailer device 2 according to another embodiment of the present disclosure. FIG. 7 provides a braking feature 80 according to another embodiment of the present disclosure. As shown, the braking feature 80 comprises a cross-bar 82 with an opposed first end 84 and second end 86, and wherein at least a portion of the length of the cross-bar 82 is adapted to contact the wheels 4a, 4b of the trailer device 2 and thereby prevent rotation of the wheels 4a, 4b. The braking feature 80 comprises a lever 88 and a user-interface 90 to allow a user to manipulate the braking feature 80 with a foot or a hand, for example. The lever 88 is interconnected to the cross-bar 82 by a linkage 92 to allow the cross-bar to pivot between locked and unlocked positions in a desired manner. For illustration purposes, only a portion of the chassis 8 of the trailer is shown in FIG. 7.

FIG. 8 is a perspective view of a component of a trailer device 2 in accordance with at least one embodiment of the present disclosure. As shown, a caster or swivel wheel 100 is provided on or proximal to a front portion of the chassis 8 of a trailer device. The wheel 100 comprises a base plate 101 that is connected to the chassis 8 or related component with a hinge 102. The hinge 102 allows the wheel 100 and base plate 101 to rotate about an axis 104. The axis 104 shown in FIG. 8 is preferably a horizontal axis that extends in a direction of travel of the trailer device, but is contemplated as comprising other arrangements in alternative embodiments. A pin connection 106 is provided to secure the wheel 100 in at least one of two positions. In a first position comprising a position of use, the wheel 100 is secured by inserting the pin 106 into a first aperture 108 that is preferably provided in the chassis 8. When use of the wheel 100 is not desired, such as may be the case when the trailer device is connected to another vehicle for towing, the wheel may be rotated to a position of non-use. The position of non-use may comprise providing the wheel 100 at any number of angles with respect to the position of use. In the depicted embodiment of FIG. 8, the wheel 100 is rotated approximately 180 degrees from the position of use to the position of non-use, and the wheel is stored in a non-use position by providing the pin 106 within a second aperture 110. The second aperture is preferably provided in the chassis 8 of the trailer device.

FIG. 9 is a perspective view of the wheel arrangement of FIG. 8, wherein the wheel 100 has been rotated to a position of non-use. As shown, the wheel 100, base plate 101, and pin 106 haven rotated such that the pin 106 is allowed to be inserted into the second aperture 110 (see FIG. 8). The pin is provided in a guide sleeve 112 located on an opposing side of the base plate 101 as the hinge 102. The pin 106 may be biased toward a locked position by the provision of a biasing member (e.g. coil spring), or may be an unbiased component of the system.

In the embodiment of FIG. 9, the wheel 100 is shown as extending from a base plate 101. In further embodiments, it is contemplated that the wheel 100 is provided on a strut or post. The strut or post is contemplated as extending from the base plate 101 or as being provided in lieu of the base plate 101. The strut or post is preferably rotatable about a substantially horizontal axis (e.g. horizontal and perpendicular to a longitudinal axis of the tongue).

Various features and embodiments of trailer devices have been provided herein. It will be recognized, however, that various features are not necessarily specific to certain embodiments and may be provided on any one or more embodiments. For example, various hot water pressure washing features may be provided on a trailer with any one or more braking mechanisms as shown and described herein. The present disclosure and embodiments provided herein are not mutually exclusive and may be combined, substituted, and omitted. The scope of the invention(s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A portable pressure washer comprising:
a chassis comprising a forward end and a rearward end;
a first pair of wheels provided proximal to the rearward end of the chassis, the first pair of wheels operable to support and convey the chassis;
a tongue extending from the forward end of the chassis, wherein the tongue is operable to be selectively secured to a towing vehicle for towing the portable pressure washer;
at least one secondary wheel provided proximal to the forward end of the chassis, wherein the at least one secondary wheel is moveable between a position of use and a position of non-use;
wherein the at least one secondary wheel comprises a base plate that is connected to the forward end of the chassis by a hinge and wherein the at least one secondary wheel is rotatable about an axis of the hinge;
wherein the chassis comprises a first aperture for securing the wheel in a first position and a second aperture for securing the wheel in a second position, and wherein the at least one secondary wheel comprises a selectively securable connection for selectively securing the wheel in the first position and the second position;
the chassis comprising at least a tank, a pump, a heating element, a power source, and a dispensing device, wherein the dispensing device is operable to dispense contents of the tank;
and
a handle extending from the rearward end of the chassis, the handle operable to be grasped by a user and to manipulate the pressure washer, wherein the selectively securable connection comprises a pin provided in a guide sleeve on an opposing side of the base plate relative to the hinge.

2. The portable pressure washer of claim 1, wherein the position of use and the position of non-use of the secondary wheel are separated by approximately 180 degrees of rotation of the secondary wheel about the horizontal axis.

3. The portable pressure washer of claim 1, further comprising a fuel tank in fluid communication with the power source.

4. The portable pressure washer of claim 1, further comprising a braking member that selectively contacts the first pair of wheels to limit a movement of the chassis; and
wherein the braking member comprises a cross-bar that is operable to contact a rolling surface of the wheels, a linkage, and a user-interface for selectively activating and deactivating the braking member.

5. The portable pressure washer of claim 1, wherein the pin is biased toward a locked position by a coil spring.

6. The portable pressure washer of claim 4, wherein the braking member comprises a foot pedal operable to transition the braking member between at least a first and second position.

7. A portable pressure washer comprising:
a chassis comprising a tongue operable to tow the portable pressure washer;
at least two primary wheels operable to support and convey the chassis, the at least two primary wheels being rotatable about an axis and having a substantially fixed position relative to the chassis;
at least one secondary wheel that is moveable between a position of use and a position of non-use;
the at least one secondary wheel comprising a base plate, and wherein the base plate comprises a hinge on a first side of the base plate and a guide sleeve on a second side of the base plate;
wherein a securing member is slidably received in the guide sleeve and biased toward a locked position, the securing member being operable to selectively secure the at least one secondary wheel in the position of use and the position of non-use;
a storage tank, a pump, a heating element, a power source, and a dispensing device, wherein the dispensing device is operable to dispense contents of the storage tank;
a handle extending from the chassis, the handle operable to grasped by a user and to manipulate the pressure washer.

8. The portable pressure washer of claim 7, further comprising a braking member operable to restrict movement of the at least two primary wheels; and
wherein the braking member comprises a crossbar with opposing first and second ends, at least one extension, and a braking surface for contacting a rolling surface of at least one of the primary wheels.

9. The portable pressure washer of claim 8, wherein the braking member further comprises an extension lever with a user-interface and a coil spring that biases the extension lever toward an unlocked position.

10. The portable pressure washer of claim 9, wherein the user-interface comprises a foot pedal that is operable to selectively engage the braking member.

11. The portable pressure washer of claim 7, wherein the securing member comprises a pin that is biased by a coil spring.

12. A portable pressure washer comprising:
a chassis comprising a tongue operable to tow the portable pressure washer;
at least two primary wheels operable to support and convey the chassis, the at least two primary wheels being rotatable about an axis and having a substantially fixed position relative to the chassis;
at least one secondary wheel provided on the tongue that is moveable between a position of use and a position of non-use;
the at least one secondary wheel comprising a base plate, and wherein the base plate comprises a hinge on a first side of the base plate and a guide sleeve on a second side of the base plate;
the at least one secondary wheel being rotatable about the hinge and about an axis that is parallel to a longitudinal axis of the tongue;
wherein at least one aperture is provided on the chassis for selectively receiving the pin and securing the at least one secondary wheel;
a storage tank, a pump, a heating element, a power source, and a dispensing device, wherein the dispensing device is operable to dispense contents of the storage tank;
a first housing and a second housing, each of the first housing and the second housing extending from the chassis and wherein the storage tank is provided at least partially between the first housing and the second housing;
a handle extending from the chassis, the handle operable to grasped by a user and to manipulate the pressure washer.

13. The portable pressure washer of claim 12, further comprising a braking member operable to restrict movement of the at least two primary wheels.

14. The portable pressure washer of claim 13, wherein the braking member comprises a cross-bar extending between the at least two primary wheels and wherein the cross-bar is operable to be provided in contact with a rolling surface of the at least two primary wheels.

15. The portable pressure washer of claim 13, wherein the braking member comprises a user-interface in the form of a foot pedal that is operable to selectively engage the braking member and a biasing member to bias the braking member toward an unlocked position.

16. The portable pressure washer of claim 12, wherein the guide sleeve comprises a coil spring to bias the pin toward a locked position.

17. The portable pressure washer of claim 12, further comprising a fuel tank in fluid communication with the power source.

18. The portable pressure washer of claim 12, wherein the storage tank is operable to store a cleaning fluid and is provided in fluid communication with the pump.

19. The portable pressure washer of claim 12, wherein the power source comprises at least one of a motor and an engine and is in communication with the pump.

* * * * *